Oct. 22, 1963 J. RABINOW 3,108,155

NARROW-BAND TELEVISION PICTURE REPRODUCTION

Filed March 31, 1961 2 Sheets-Sheet 1

INVENTOR

Jacob Rabinow

BY Max L. Libman

Joseph A. Genovese

ATTORNEYS

INVENTOR
Jacob Rabinow
BY Max L. Libman
Joseph A. Genovese
ATTORNEYS

United States Patent Office 3,108,155

Patented Oct. 22, 1963

3,108,155

NARROW-BAND TELEVISION PICTURE REPRODUCTION

Jacob Rabinow, Takoma Park, Md., assignor to Rabinow Engineering Co., Inc., Takoma Park, Md.

Filed Mar. 31, 1961, Ser. No. 99,938
8 Claims. (Cl. 178—7.1)

This invention relates to the transmission and reception of television signals, and has for its primary object the provision of a television system capable of sending effectively the same amount of information as conventional television systems, but using only a fraction of the bandwidth.

It is well known that the availability of channels for television stations is presently limited by the bandwidth required by each station for the transmission of satisfactory pictures as compared to the total bandwidth available for all stations. It is apparent that any system which can reduce the bandwidth required for a single transmission and reception channel would correspondingly increase the availability of a limited national utility, and would have great commercial value.

As is well known, the present standard system of television used in the United States sends out 60 fields or 30 complete pictures per second. This rate is employed in order to minimize flicker, since the eye cannot see 30 independent pictures in a second, and the brain cannot absorb this amount of information. As far as the eye is concerned, the information content of 4, 5, or 6 pictures per second would be sufficient, providing there were no flicker and providing the transition from one picture to the next could be made smoothly. For example, five pictures a second could be sent, and each picture repeated six times before the next is presented, to produce the required 30 complete pictures, and this would be better than merely sending every sixth picture without the repetition. However, when the inevitable transition between the sixth repetition of the picture and the next picture occurs, there would be an appreciable jump on the sixth frame, which would be psychologically undesirable to the observer.

It is a major object of the present invention to transmit by the above general scheme, i.e., transmit only a fraction of the separate pictures or frames now transmitted, and, in effect, repeat each picture the necessary number of times to make up the 30 frames per second, but to provide means at the reception end for fading-in gradually from one picture to another in a manner such that stationary objects appear the same in all the intermediate pictures, while moving objects, that is, those objects which change position between the two transmitted frames are gradually faded in from one frame to the other in the respective intermediate frames.

Another object is to provide means for photographically reproducing television pictures for transmission, with the spaces between successive lines of the picture optically broadened out to improve the separation between the successive lines for even reproduction by scanning.

In accordance with the invention and in furtherance of its broad object, the bandwidth may be narrowed in $1/n$ of its usual value in the following manner: Assuming that it is desired to display 30 frames per second as above indicated, and the value of $n$ is 5, i.e., the bandwidth is reduced to ⅕ its conventional value. Then, instead of transmitting all 30 pictures, only six significant frames per second would be transmitted over the transmission line or link between stations, these being spaced apart so that they would correspond to the first, the sixth, the eleventh, etc., picture of the present system. These pictures are received at the local transmitting station, and are temporarily stored for an interval long enough so that at least two successive pictures can be treated simultaneously. After this, the system of the invention locally produces a linear interpolation between the pictures while repeating them five times as fast as they were originally transmitted, so that 30 pictures are now produced in the same time as the six pictures are being transmitted. The eye does not know the difference between having a smooth transition between the first to the sixth frame as compared to a sudden transition, since the persistence of vision of the eye is such that instantaneous changes look like gradual changes. The result is that substantially flickerless operation is sensed by the observer, due to the smooth transmission from frame to frame. The bandwidth of transmission, however, is reduced so that the same channel that now carries one television picture could carry five. It could, for example, supply a number of closed circuit television systems in addition to the broadcast frequency, or the increased information-transmitting ability may be utilized in any manner which is profitable or beneficial.

According to the invention, each two successive pictures transmitted at the slow rate are scanned simultaneously line-by-line and element-by-element, at the high frequency repetition rate which is desired. In the above example, each two pictures would thus be successively scanned five times to give the rate of 30 pictures per second. Each element thus scanned produces a voltage output corresponding to the strength of the picture signal at that point, and these voltage outputs are transmitted to a comparison and utilization device which upon each of the successive five repetitions uses a smaller fraction of the first one and a greater fraction of the second one until the picture has completely faded from the first to the second. Where the two signals are the same, that is, where there has been no motion, this fading from one value to the other will produce no change. However, where there has been motion, this fading of the signal will produce in each successive picture a composite picture which initially emphasizes the first position of the moved object, and gradually fades this into the second position of the moved object, as will be explained in detail below.

The specific nature of the invention, as well as other objects and advantages thereof, will clearly appear from a description of a preferred embodiment as shown in the accompanying drawings, in which.

Figure 1:
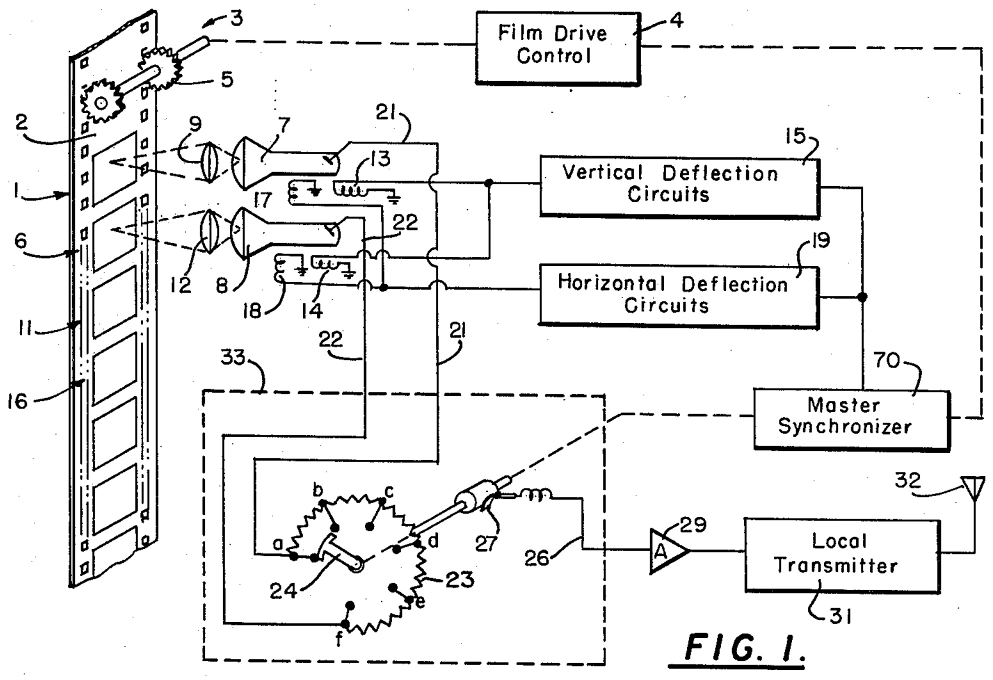
FIG. 1 is a schematic drawing showing the principle of the invention using photographic storage.

Referring to FIG. 1, it is assumed that the transmitting station has transmitted to the receiving station the picture information in the form of a series of frames, only instead of the customary 60 fields interlaced to define 30 frames per second, every fifth frame has been transmitted. It is apparent that this will require only ⅕ of the normal bandwidth, since only ⅕ as much information is being transmitted. The equipment for transmitting and receiving the picture is therefore perfectly conventional, except that only ⅕ of the conventional bandwidth need be employed. At the receiving station, the pictures received are projected onto a photosensitive film 2 in succession as received, similar to an ordinary movie film, rapidly developed by high-speed methods now available, and then run through a film advancing mechanism 3, very similar to the film advancing mechanism in an ordinary moving picture camera. However, the control drive mechanism 4 for driving the film sprocket wheels 6 is made to provide a somewhat different type of intermittent motion from that used for moving picture projection purposes. Instead of driving the film so that each picture will be halted for 1/30 of a second and then moved away one frame in the next 1/30 of a second as is now done for 30-picture per second operation, the drive is arranged to halt each picture for approximately five times as long as the previous practice required, that is, approximately 5/30 or 1/6 of a second. During this interval, each picture, or rather each two successive pictures are completely scanned five times, so that the scan output is at the rate of 30 pictures per second. During a few milliseconds at the end of this interval the film strip is rapidly advanced by one picture so that each frame is now in the position previously occupied by the frame ahead of it, and the process is repeated. The details of the film drive control for accomplishing this motion are not shown, as this is within the skill of any mechanical designer of such equipment and is not per se an object of the present invention.

The film strip 2 of FIG. 1 is shown with a number of successive frames, each comprising an entire picture of the scene being viewed, and labelled successively No. 1, No. 6, No. 11, etc. These numbers are used to indicate that the successive pictures on film strip 2 are first, sixth, eleventh, etc., frames corresponding to the conventional 30-per second now transmitted according to conventional movie and television practice. Each frame has a conventional 524 lines per second according to current U.S. practice. The customary practice of interlacing the lines will be ignored in the present explanation, as stated earlier, since it does not affect the principle here being described. It will therefore be assumed that all of the lines are produced in succession from top to bottom, and the scanning will be described in these terms.

Since in practice, if the lines are packed with the usual density employed for film projection, it becomes very difficult to accurately separate the successive scan lines due to the closeness of their spacing; it is preferred (but not required) according to the present invention, to optically separate the lines while printing them on the film, for example, by a factor of three. Thus, each frame for a given size picture will be three times as long in comparison with its width as is customary. By doing this, the problem of scanning the successive lines without interference from adjacent lines is rendered much easier. Of course, the problem of film transport between successive frame positions is involved, since the film must be moved three times as fast for the same effect, but film and tape transport devices can easily handle film at this rate. The film lines can be readily spaced further apart than is customary by adjusting the film speed or in any other known way. With the scan lines so separated, the reading spot can readily be optically servoed, if desired, to insure that it follows each line and does not jump a line.

With the film in the position shown in FIG. 1, frames No. 1 and No. 6 are simultaneously scanned line-by-line in order that a comparison may be made of the results of the two scans. For this purpose, any suitable conventional scanning means may be employed, for example, two standard image orthicon tubes 7 and 8, provided with respective lens systems 9 and 12 spaced apart by exactly the same distance as successive frames (e.g., No. 1 and No. 6) are spaced. The respective vertical deflection coils 13 and 14 of tubes 7 and 8 are driven together from the same vertical deflection control circuit 16, and the horizontal sweep coils 17 and 18 are similarly driven simultaneously from the same horizontal deflection circuits 19. Thus both frames No. 1 and No. 6 are scanned simultaneously element for element and line for line. The output lines 21 and 22 of the two image orthicon tubes 7 and 8 are respectively connected to opposite ends of a potentiometer 23. From those areas of the successive pictures No. 1 and No. 6 where no motion has occurred, typically from the background of the picture, the amplitude of the signal voltage on lines 21 and 22 will be exactly the same. Therefore, the voltage at all points along potentiometer 23 for these areas will also be the same, and will correspond to the intensity of brightness of the elemental areas of this background. However, when an object in the picture has moved between successive frames such as No. 1 and No. 6, since the pictures are no longer identical at these points, it will be apparent that when the areas in which these objects lie are being scanned, the outputs on lines 21 and 22 respectively will be different. This means that the voltages applied to the respective ends *a* and *f* of potentiometer 23 will now be different and there will be a voltage gradient along the potentiometer corresponding to this difference. If six taps are provided in a circular array at points *a*, *b*, *c*, *d*, *e*, *f*, then it is apparent that when wiper arm 24 is in contact with point *a*, the output on line 26, which is connected by means of brush 27 to wiper arm 24, will correspond entirely to the output of line 21, that is, the output of frame No. 1. Similarly, when wiper arm 24 is in contact with point *e* of the potentiometer, the output on line 26 will correspond nearly to frame No. 6 of the film strip. At point *b*, the output on line 26 will be 4/5 that of line 21 and 1/5 that of line 22, and similarly, as the wiper arm progresses from point *a* to point *f*, the output on line 26 will be gradually faded from that influenced mostly by picture No. 1 to that influenced by picture No. 6. The wiper arm is moved at such a rate that it remains in contact with each tap of the potentiometer which one complete scan of the two frames No. 1 and No. 6 is being made, and its motion is controlled from film drive control 4 at such a rate that the arm 24 passes from tap *e* back again to tap *a* during the interval while the film strip is advanced one frame so that, in the example shown, the second circuit of the wiper arm will be made when frame No. 6 is in the position originally occupied by frame No. 1 and frame No. 11 is in the position originally occupied by frame No. 6. In this manner, during each circuit of the wiper arm 24, five successive complete scans of the picture in each frame are being made, while the output information on line 26 represents five frames of information, each frame being successively faded in from the uppermost picture being scanned to the next following frame picture.

What will be seen during the intermediate scans, for a moving object, is as follows: During the first scan, the information of the upper picture will be transmitted in toto. During the fifth scan, 4/5 of the information of the lower picture will be transmitted and only 1/5 of the upper picture. During the intermediate picture scans, the background information which is stationary will, of course, remain unchanged, but the information corresponding to a moving object will be changed in such a manner that the object appears to gradually fade out at the one position and fade in to the successive position in which it is shown in the next frame. Thus the jerky effect which would be produced if the eye were shown the two pictures in succession without any fading is avoided, and the result is a smooth effect of continuous motion from one position to another. It will be understood that actually the intermediate positions of the object between successive frames are not shown, but the optical effect of fading one out while the other is faded in produces a mental impression on the observer of smooth movement between the two positions. It would be possible, by the use of modern high-speed computer techniques to actually compute the necessary strength of the signal to make the object appear at successively displaced positions between the two frames, but the complexity of the equipment required to produce this result is so great that at this date the expense would probably not be warranted. Psychologically, the simple system shown produces a very similar effect to that produced by showing all of the actual intermediate positions of the moving objects.

The signal output on line 26 is amplified by conventional means 29, and transmitted by means of a local transmitter 31 and antenna 32 for broadcast purpose to the individual homes of the receivers; alternatively, the image may be sent out on closed coaxial circuits, or used in any other known manner.

Figures 1B, 2, 3, 4:
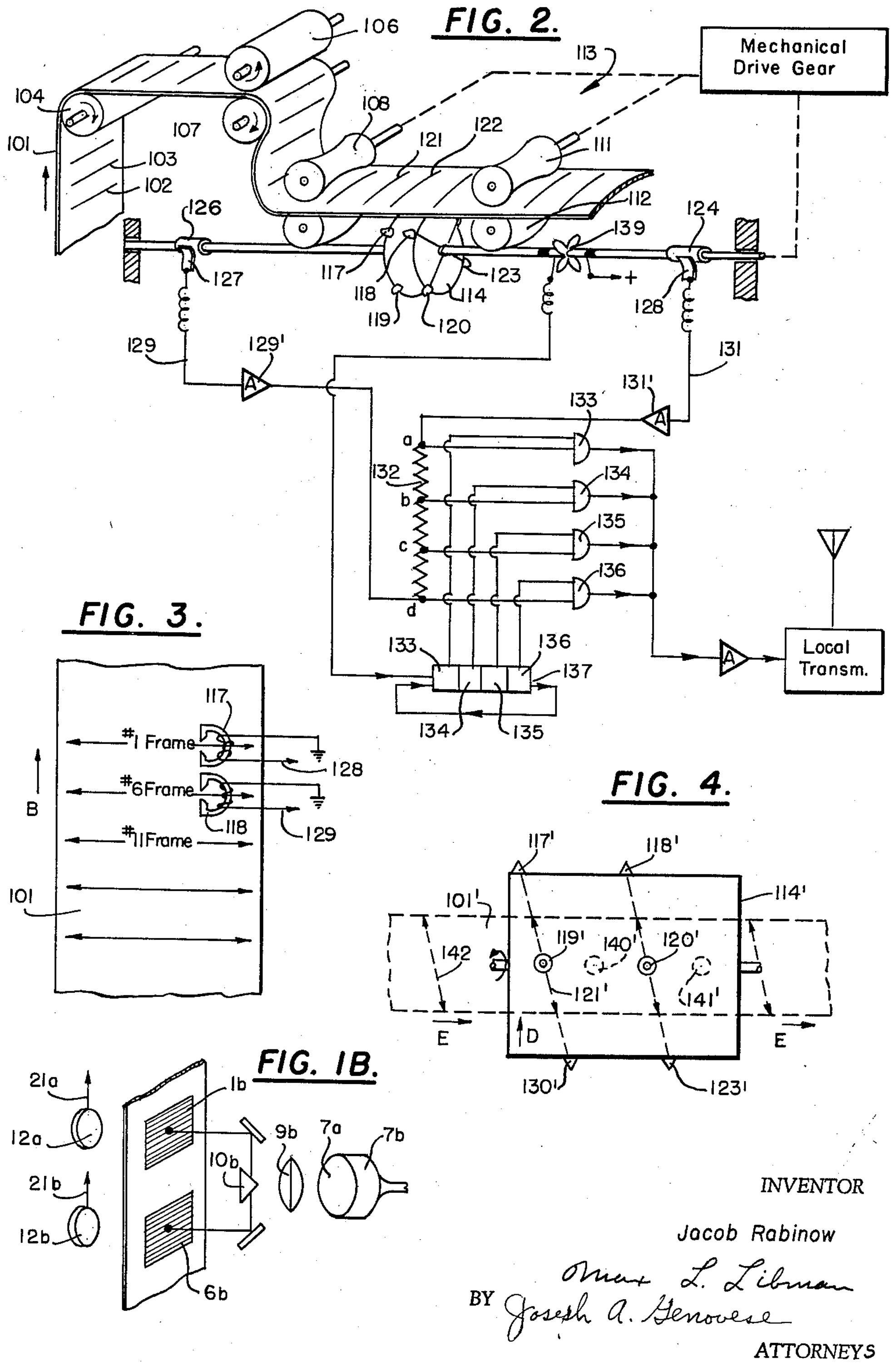
FIG. 1B is a fragmentary schematic view of a modification.
FIG. 2 is a schematic view of the invention using magnetic storage and readout.
FIG. 3 is a developed view of the magnetic tape of FIG. 2 used in explaining the principle of operation.
FIG. 4 shows an alternative arrangement of reading heads for continuous reading without stopping the tape.

Instead of using two image orthicons as shown in FIG. 1, a cathode ray tube *7b* may be used, as shown in FIG. 1B, as a light source, producing a light spot *7a* which is moved from side to side by the customary deflecting coils, so that it scans each line of the two frames being compared. This is accomplished by means of a lens *9b* and a beam splitter *10b*, which project two images of flying light spot *7a* simultaneously upon corresponding portions of the two frames, *1b* and *6b*, being compared. Two photocells *12a* and *12b* respond respectively to the light transmitted by these two flying spots, and the resulting outputs of these photocells are taken on lines *21a* and *21b*, corresponding to lines 21 and 22 respectively in FIG. 1, and utilized in the same manner as in FIG. 1. The beam splitter *10b* is schematically shown as a prism, but may be any known optical device for splitting a beam. The chief advantages of this modification are that the same light source intensity can be assured for both films, and mechanical focusing and adjustment will insure that the two flying spots always hit corresponding portions of the two frames.

The receiver shown in FIG. 1 would ordinarily be at a station which feeds a local transmitter from a national distribution network; in other words, the national distribution network can use the present bandwidth narrowing technique and a local transmitter working at short range would be used to transmit the 30 frames as is done today. The home receiver would be unable to distinguish between the picture transmitted when the full bandwidth is employed, and the national distribution network can, of course, transmit five times as much information as heretofore. In theory, of course, the system of FIG. 1 could be employed at each individual receiver, so that the local transmitter would be able to serve five times as many channels as presently, but the expense for individual receivers would, at present, be prohibitive. Eventually, as electronics become more advanced and the expense of the equipment reduced, it is contemplated that the present technique could be applied to the individual receivers.

Figure 1A:
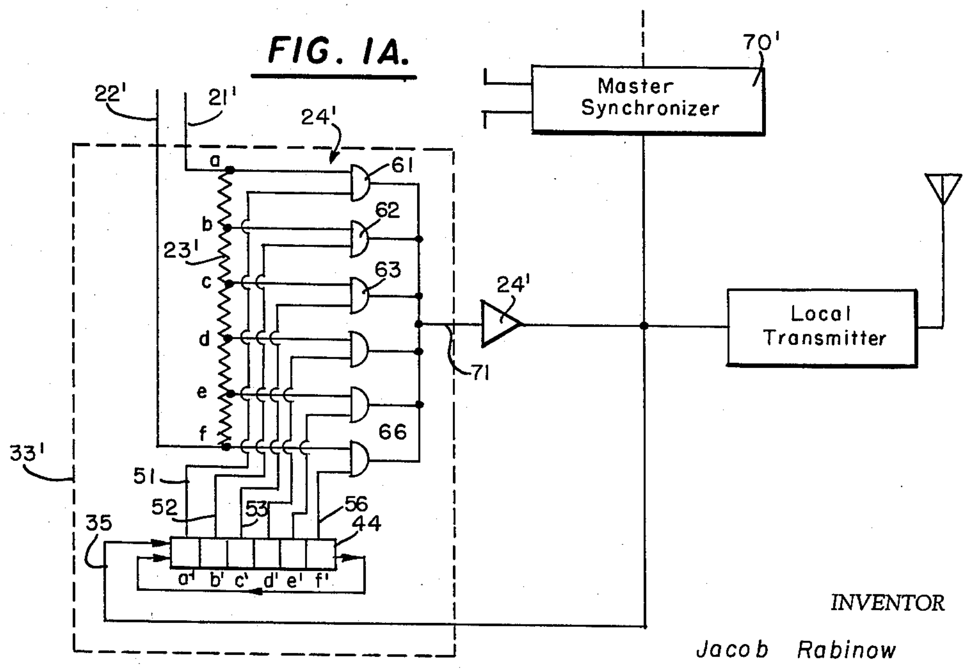
FIG. 1A is a schematic circuit diagram of an alternative form of commutator for use with the system of FIG. 1.

FIG. 1A shows the use of an electronic commutating system instead of the mechanical rotary switch arrangement of FIG. 1. The elements within the dotted line box 33 of FIG. 1 are replaced by those within the dotted line box 33′ of FIG. 1A for this purpose. Potentiometer 23 is replaced by potentiometer 23′, which need not have any particular geometric configuration. Potentiometer 23′ is supplied with the input on lines 21′ and 22′, corresponding to the similarly numbered lines of FIG. 1. The electronic commutator 24′ replaces the rotary wiper 24 of FIG. 1, and consists of an ordinary electronic stepping counter such as are largely used in electronic digital computers today. Counters of this type may now be purchased commercially. The counter is arranged to receive pulses on line 35, and each such pulse causes the counter to step over one stage. For example, when stage *a′* of the counter is energized, line 51 connected to that stage is energized; this line goes to one input of And-Gate 61, the other input of which is connected through tap *a* of the potentiometer 23′. At this time, the output of tap *a* is transmitted through And-Gate 61 to line 71, the voltage outputs at the remaining taps of the potentiometer not being transmitted through their respective And-Gates 62, 63, etc., because the corresponding stage outputs of the electronic stepper 44 on lines 52, 53, etc., are not energized. Stage *a′* of stepper 44 remains energized during the first scan of frames No. 1 and No. 6 as above described, and at this stage, the picture transmitted to the local transmitter 31′ corresponds to frame No. 1. At the completion of the first scan, another pulse is supplied on line 35, stepping the stepper 44 to stage *b′*, whereby the output of tap *b* of potentiometer 23′ is now transmitted through And-Gate 62 to the local transmitter in the same fashion as above described. The stepping pulses on line 35 are derived from a master synchronizer 70′, which also controls the vertical and horizontal deflection circuits, and the same pulse which controls the picture repetition may be used for this purpose.

It will be apparent that the electronic commutator of FIG. 1A is essentially similar in principle to the mechanical commutator of FIG. 1, and these devices can be used interchangeably.

FIG. 2 shows a form of the invention utilizing magnetic tape instead of photographic film. This is now a well-known expedient for the storage of television pictures, and such tape is commercially available and widely used. In the most commonly used commercial tape equipment made by Ampex, the tape is made sufficiently wide so that approximately one-eighth of each picture frame is stored on a single horizontal line of tape recording, and such tape can be readily adapted to the present purpose. However, in order to simplify the explanation, it will be assumed that magnetic tape sufficiently wide is used so that an entire frame can be stored on one horizontal line such as 102 of the tape 101. Line 103 would then contain the next frame, etc. The tape is moved by a transport system of a guide roller 104, drive rollers 106 and 107 at one side of the reading station 113, and means (not shown) at the other side of the reading station to pull the tape at synchronous speed. At the reading station, the tape is passed between two rollers 108 and 109, shaped to distort the tape surface transversely into an arcuate form. This is accomplished by making a roller 108 of a spindle shape and roller 109 of a corresponding barrel shape, so that as the tape passes between them, it is given the desired arcuate curvature. Similar rollers 111 and 112 may be provided at the other end of the reading section or station 113. A drum 114 mounted on shaft 116 is supported at the reading section in such manner that a number of magnetic reading heads 117–120 mounted on the periphery of the drum will pass adjacent the undersurface of the tape as the drum is rotated so as to read the information recorded upon the tape. In the example of FIG. 2, the number $n$ by which the normal bandwidth is to be divided is shown as four, that is, there will be four repetitions of each pair of successive pictures while fading is accomplished between the two pictures as previously described. It will be noted that the magnetic heads are mounted on drum 114 in pairs such as 117, 118, the two heads being spaced apart on the drum by a distance corresponding exactly to the distance between two successive lines of recording such as 102 and 103 or lines 121 and 122, which are just about to be read by the two heads 117 and 118. There are four such pairs of heads uniformly spaced on the drum, so that at each rotation of the drum, during which the tape is held stationary, two successive lines of recorded information are read four times in succession by the four successive pairs of reading heads. The output leads of the right-hand set of reading heads 118, 120, 123, etc., are all connected through shaft 116 to a conductive slip ring 124 so that the voltages produced in the windings of the reading heads as they successively traverse each line of recorded information (corresponding to a single frame of the recorded picture) are all transmitted to slip ring 124. Similarly, the left-hand set of reading heads 117, 119, etc., have their outputs connected to slip ring 126. Brushes 127 and 128 and respective leads 129 and 131 connect these outputs respectively through amplifiers 129′ and 131′ to ends *a* and *d* of potentiometer 132. This potentiometer is provided with two intermediate taps *b* and *c*, corresponding to the taps of potentiometer 23 of FIG. 1, except that only two instead of four intermediate taps are provided in this example. A series of And-Gates 133–136 is provided, similar to the showing of FIG. 1A, and a stepping counter 137, the operation being the same as described in FIG. 1A. The pulses to step counter 137 may conveniently be provided on line 138 from a four-pronged contact device 139 properly phased with respect to the reading heads to provide the pulses at the correct intervals. The transmitting apparatus may be the same as shown in FIG. 1.

It will be apparent that instead of the electronic commutation shown in FIG. 2, the mechanical switching commutation of FIG. 1 may be used if desired.

FIG. 3 shows a developed view of the tape of FIG. 2, with the two magnetic heads 117 and 118 in the act of reading respective lines 121 and 122, as the heads are moving in the direction of the arrow A. The tape 101, while it is being transported, moves in the direction of the arrow B, but the driving mechanism is arranged to step the tape by one line during the interval between successive reading rotations of drum 114. This may be done in a number of ways, for example, the reading heads, instead of being equally spaced circumferentially around the drum, may be so spaced that the interval between the first pair of heads and the last pair is larger so that the tape may be moved during this interval. Alternatively, the heads may be uniformly spaced, but the reading surface switched off during the interval while the tape is being transported into its successive positions. The important thing is that no reading should occur during the interval while the tape is in motion, and the reading immediately commence as soon as the tape has stopped. In FIG. 3, lines 128 and 129 are shown as directly connected to the respective reading head windings, but it will be understood that actually this connection is made through the slip rings 124 and 126 as shown in FIG. 2.

Although the tape 101 is shown as a discrete strip of tape, it will be understood that in practice an endless belt of tape can be used, since the pictures can be erased as soon as they have been read, unless it is desired to store the tape for future use. For the present purpose, the tape functions only as a temporary storage device, and it is merely necessary that it be able to store two successive pictures and to record a third picture while these two are being read.

It will be apparent that any known type of storage device may be employed as well as magnetic or photographic storage. For example, a cathode-ray storage tube such as shown in U.S. Patents to Graham, Nos. 2,629,010, and 2,652,449, may be used. In this case, the two successive frames to be scanned will be stored on two different storage tube mosaics, then scanned simultaneously and repetitively as above described, then the first picture will be erased and replaced by a third picture (e.g., No. 11 in FIG. 1), and the scanning steps repeated, etc. With such high-speed equipment, there will be only a very small fraction of a second delay in reproduction of the final transmitted pictures, corresponding to the time interval between successive frames.

It is possible to simplify the tape drive mechanism by having it move the tape continuously without any stops while the lines of recording which represent the sets of frames are being repeatedly scanned. This can be accomplished, as indicated in FIG. 4, by mounting the successive pairs of heads with helical displacement along the drum. Referring to FIG. 4, the tape 101′ is assumed to be advancing over the top of drum 114′ as in FIG. 2, and is similarly curved to maintain uniform distance from the reading heads. In this case, however, the tape is not stopped during the reading process, but advances continuously in the direction of the arrow E. The lines of recording, e.g., 121′, 122′, are therefore slanted at such an angle that, considering reading head 119′, it remains in contact with line 121′ while the drum is moving and the tape is rotating, until it has completely traversed the width of the tape 101′. At the same time, reading head 120′ is similarly following line 122′. The spacing between reading head 119′ and reading head 130′ is such that just as head 119′ leaves the upper edge of the tape as shown in FIG. 4, reading head 130′ begins to traverse the lower edge of the tape, and since it is helically displaced with respect to head 119′, this engagement takes place just as head 130′ is opposite the lower edge of line 121′. The reading head 123′ at the same time is beginning to engage line 122′. Since there are four pairs of such reading heads, it will be apparent that lines 121′ and 122′ will be scanned or read four times as they pass the drum 114′ while the tape 101′ is in continuous motion. The slope of the helix on which the successive reading heads are placed is such that after line 121′ has been read by the first four reading heads 117′, 119′, 130′, and 140′ it is read again by the second set of reading heads beginning with 118′, just as the next line of recording 142, representing the next successive frame, begins to be simultaneously read by head 117′. It is thus apparent that both the drum 114′ and the tape 101′ can be moved continuously and no intermittent motion is required. If the frame requirements are such that a small interval should be provided between the reading of successive frames, then the interval between the first reading head 117 and the last reading head 140 can be made somewhat more than 90°, and the other reading heads uniformly spaced in the remaining arcuate distance.

It will be apparent that the embodiments shown are only exemplary and that various modifications can be made in construction and arrangement within the scope of the invention as defined in the appended claims.

I claim:

1. In a system for transmitting picture information in the form of discrete frames, each representing a successive scene of a transmission system; means for storing information corresponding to two successive frames; means for simultaneously and similarly scanning the information of both frames to produce two time-varying signal outputs both instantaneously responsive to the corresponding elemental areas of each of said two frames, whereby when the picture content of said two frames is unchanged, said two outputs are equal; means for comparing said two outputs including means for producing a resultant instantaneous output whose value lies on a gradient between said two outputs; means for repeating said scanning operation a number of times and at each repetition changing the point along said gradient at which said resultant output is derived, from that corresponding to the earlier one of said frames to that corresponding to the later one of said frames, to produce a series of output frames fading from the first of two successive frames to the second of two successive frames.

2. The invention according to claim 1, said two-time varying signal outputs being voltage outputs which vary in accordance with the intensity of the signal; said means for comparing said two outputs being a potentiometer device, said two voltage outputs being fed to the respective ends of said potentiometer device, and said means for producing a resultant and instantaneous output being a tap-changer movable to various points along said potentiometer device.

3. The invention according to claim 2, said means for storing being magnetic tape storage means.

4. The invention according to claim 2, said means for storage being photographic means.

5. The invention according to claim 4, said means for simultaneously scanning comprising two image orthicon tubes arranged to simultaneously scan two corresponding portions of said successive frame information on said photographic storage means.

6. The invention according to claim 3, said means for simultaneously scanning comprising two magnetic reading heads arranged to simultaneously scan two corresponding positions of said successive frames information on said magnetic tape storage means.

7. In a television system of the type wherein successive frames of a scene are transmitted to a receiving station at a standard rate; means to obtain a reduction in bandwidth by transmititng a lower rate of time-spaced complete frames than said standard rate; means at the receiving station for simulating smoothness of motion of an object in a scene when said smoothness would be lost by said lower rate of time-spaced frames, comprising means for deriving a succession of intermediate frame signals from two adjacent time-spaced frames, the signals successively decreasing in strength at a point corresponding to the position of an object in the first of said successive frames and increasing in strength at a point corresponding to the new position of the object in the second of said selected frames.

8. The invention according to claim 7 and means to sequence said first selected frame signal and then said intermediate frame signals and then said second frame signal so that when the signals are used to display a picture, the object in the scene appears to move by fading out at one location and fading in at a new location.

References Cited in the file of this patent

UNITED STATES PATENTS

| | | |
|---|---|---|
| 2,202,605 | Schroter | May 28, 1940 |
| 2,824,904 | Toulon | Feb. 25, 1958 |